US010067975B2

(12) United States Patent
Seo et al.

(10) Patent No.: US 10,067,975 B2
(45) Date of Patent: Sep. 4, 2018

(54) CONVERSATION BASED SEARCH SYSTEM AND METHOD USING A TOUCH-DETECTION SURFACE SEPARATED FROM THE SYSTEM'S SEARCH WINDOW

(71) Applicant: NAVER Corporation, Seongnam-si (KR)

(72) Inventors: Hee-Cheol Seo, Seongnam-si (KR); Injae Lee, Seongnam-si (KR); Taeil Kim, Seongnam-si (KR); Youngho Na, Seongnam-si (KR)

(73) Assignee: NAVER CORPORATION, Seongnam-si (KR)

(*) Notice: Subject to any disclaimer, the term of this patent is extended or adjusted under 35 U.S.C. 154(b) by 97 days.

(21) Appl. No.: 14/538,409

(22) Filed: Nov. 11, 2014

(65) Prior Publication Data
US 2015/0134337 A1 May 14, 2015

(30) Foreign Application Priority Data
Nov. 13, 2013 (KR) .................. 10-2013-0137381

(51) Int. Cl.
G10L 21/00 (2013.01)
G10L 15/00 (2013.01)
G06F 17/27 (2006.01)
G06F 17/30 (2006.01)
G06Q 30/02 (2012.01)
G10L 15/22 (2006.01)

(52) U.S. Cl.
CPC .... *G06F 17/30401* (2013.01); *G06F 17/2785* (2013.01); *G06F 17/30672* (2013.01); *G06Q 30/02* (2013.01); *G10L 15/22* (2013.01)

(58) Field of Classification Search
CPC .............. G06Q 30/02; G06F 17/30672; G06F 17/2785
USPC .................................................. 704/277, 251
See application file for complete search history.

(56) References Cited

U.S. PATENT DOCUMENTS 7,206,747 B1 * 4/2007 Morgan ........................ 704/251
2005/0033582 A1 * 2/2005 Gadd ..................... G06Q 30/02
704/277

(Continued)

FOREIGN PATENT DOCUMENTS

JP 2002-132804 5/2002
JP 2007257016 A 10/2007

(Continued)

OTHER PUBLICATIONS

Japanese Office Action dated Sep. 29, 2015 by the Japanese Patent Office corresponding to Japanese patent application No. 2014-200255.

(Continued)

*Primary Examiner* — Farzad Kazeminezhad
(74) *Attorney, Agent, or Firm* — Greer Burns & Crain, Ltd.

(57) ABSTRACT

A conversation based search method includes the steps of: proposing an utterance phrase corresponding to a query input by a user; and reforming the query by means of an answer from the user and offering a search result corresponding to the reformed query, wherein the user answer is presented by the user using a touch-detection surface separated from a user terminal search window in which the user receives the search results.

14 Claims, 12 Drawing Sheets

(56) References Cited

U.S. PATENT DOCUMENTS

2011/0047149 A1* 2/2011 Vaananen ......... G06F 17/30672
707/723
2015/0066479 A1* 3/2015 Pasupalak ............... G06F 17/27
704/9

FOREIGN PATENT DOCUMENTS

| | | |
|---|---|---|
| JP | 2011-076360 | 4/2011 |
| JP | 2012248161 A | 12/2012 |
| JP | 2013-134755 | 7/2013 |

OTHER PUBLICATIONS

Kono Izumi; "A Guidance System Using a Human-like Character Interface"; Proceedings of 13th Symposium of Human Interface, Japan, Society for Measurement and Automation Control : Human Interface Division, Oct. 23, 1997; pp. 463-468.

Office Action issued by the Patent Office of Japan for corresponding Japanese Patent Application No. 2016-195529, dated Mar. 13, 2018.

* cited by examiner

CONVERSATION BASED SEARCH SYSTEM AND METHOD USING A TOUCH-DETECTION SURFACE SEPARATED FROM THE SYSTEM'S SEARCH WINDOW

CROSS-REFERENCE TO RELATED APPLICATIONS

A claim for priority under 35 U.S.C. § 119 is made to Korean Patent Application No. 10-2013-0137381 filed Nov. 13, 2013, in the Korean Intellectual Property Office, the entire contents of which are hereby incorporated by reference.

BACKGROUND

The embodiments of the present invention described herein relate to a search system and method offering a search result in correspondence with a user's query.

With the recent development of information technology, it is becoming available to access the internet anytime and anywhere. These days, most internet users are easily allowed to search information and then utilize their desired contents and services, regardless of time and space.

In the key-wording service, which is the most usual searching method, if there is an input of query for searching information by a user, the service provides website information, news information, or document information of file names, being involved in the query.

Referring to Korean Patent No. 10-1048546 (issued on Jul. 5, 2011) as an example, there is disclosed that after extracting a keyword from a query input by a user, the keyword is used for offering a search result corresponding to the query.

Along the advancement of internet searching techniques, it is above all important for a search engine to correctly grasp a user's intention, as well as to offer an accurate search result for the user's query.

Since users have faculty gaps between them in searching on the internet and varieties in making queries, search engines are required to have capacities of accurately understanding users' intentions of queries and offering search results desired by the users.

SUMMARY

One aspect of embodiments of the present invention is directed to provide a search system and method acting as a guide rendering a user to be able to search a document suitable for a user's intention by way of a conversation with the user.

Another aspect of embodiments of the present invention is directed to provide a search system and method capable of guiding a user toward a correct query suitable for a user's substantial intention, by way of a conversation, from a long, inferior, vague, and incomplete query.

In one embodiment, a conversation based search method may include the steps of: proposing an utterance phrase corresponding to a query input by a user; and reforming the query by means of an answer from the user on the utterance phrase and offering a search result corresponding to the reformed query.

The utterance phrase may be an inquiry asking a condition corresponding to the query.

The step of proposing the utterance phrase may offer the utterance phrase along with the search result corresponding to the query, and the step of offering the search result may update the search result, which corresponds to the query, into a search result corresponding to the reformed query.

The step of proposing the utterance phrase may offer, if the utterance phrase corresponding to the query is made in plurality, the plurality of the utterance phrases one by one in sequence.

The step of proposing the utterance phrase may offer, if the utterance phrase corresponding to the query is made in plurality, the plurality of the utterance phrases in a time.

The step of proposing the utterance phrase may display a conversation window containing the utterance phrase if there is an input of the utterance phrase, and switch the utterance phrase, which is displayed in the conversation window, according a user's input to the conversation window.

The step of proposing the utterance phrase may display a conversation window containing the utterance phrase if there is an input of the utterance phrase, and skip a current utterance phrase, which is displayed in the conversation window, according an answer input through the conversation window and switch the current utterance phrase to the next utterance phrase.

The step of proposing the utterance phrase may display a conversation window containing the utterance phrase if there is an input of the utterance phrase, and according an answer input through the conversation window and connectivity of the utterance phrase, skip a current utterance phrase, which is displayed in the conversation window, and switches the current utterance phrase to the next utterance phrase or re-display the current utterance phrase.

The reformed query may be made from a combination with at least one of keywords contained in the query.

If the utterance phrase is made in plurality, the step of offering the search result may reform the query to update the search result whenever there is an input of an answer to each utterance phrase.

If the utterance phrase is made in plurality, the step of offering the search result may reform the query at once to offer the search result after there is an input of an answer to the last one of the utterance phrases.

If the utterance phrase is made in plurality, the step of offering the search result may intermediately reform the query to update the search result whenever there is an input of an answer to at least a part of the utterance phrases.

In another embodiment, a conversation based search system may include: an utterance section configured to propose an utterance phrase involved in a query input by a user; and a search section configured to reform the query by means of an answer of the user to the utterance phrase and offer a search result corresponding to the reformed query.

BRIEF DESCRIPTION OF THE DRAWINGS

The above and other objects and features will become apparent from the following description with reference to the following figures, wherein like reference numerals refer to like parts throughout the various figures unless otherwise specified, and wherein.

DETAILED DESCRIPTION

Figure 1:
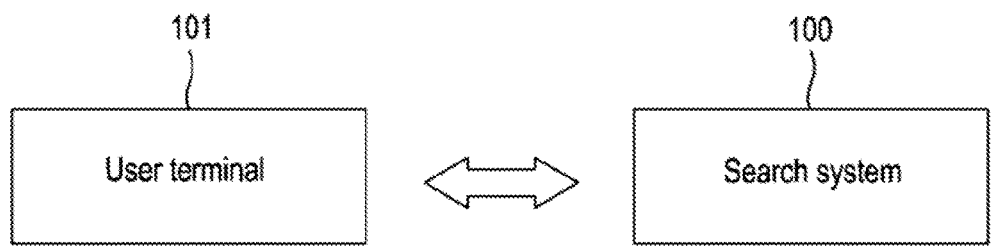
FIG. 1 schematically illustrates a relation between a user terminal and a search system in accordance with an embodiment of the present invention.

Embodiments will be described in detail with reference to the accompanying drawings. The present invention, however, may be embodied in various different forms, and should not be construed as being limited only to the illustrated embodiments. Rather, these embodiments are provided as examples so that this disclosure will be thorough and complete, and will fully convey the present invention to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Now hereinafter will be described exemplary embodiments of the present invention in conjunction with accompanying drawings.

These embodiments of the present invention may be applicable to search engine systems for offering search results corresponding to queries made by users.

In this description, the term 'document' means data as targets to be searched in correspondence with a query. This document may include informal data such as web data, e.g., blogs or bulletin boards, as well as formal data such as databases.

FIG. 1 schematically illustrates a relation between a user terminal 101 and a search system 100 in accordance with an embodiment of the present invention. In FIG. 1, the arrow denotes that data can be received and transmitted through a wired/wireless network between the search system 100 and the user terminal 101.

The user terminal 101 may denote all kinds of terminals, e.g., a personal computer, a smart phone, a tablet computer, etc., capable of accessing web/mobile sites, or installing and executing service-specific applications. For this, the user terminal 101 may conduct general service operations, such as service screen edition, data input, data transmission and reception, data storage, etc., under the control of the web/mobile site or the service-specific application.

The search system 100 functions as a search engine to offer a search result from a search conducted in a computer network such as the Internet, corresponding to a query made by a user. Especially, the search system 100 may act as a guide to help a user to obtain his desired result, by inducing the user to arrive at a correct query through a conversation with the user and thereby correcting an incorrect query. For the purpose of correcting a query for a search, the search system 100 may be implemented in a single system coupled with a conversation system (not shown) which processes a conversation with a user, or in a type including an additional system that cooperates with the conversation system.

Figure 2:
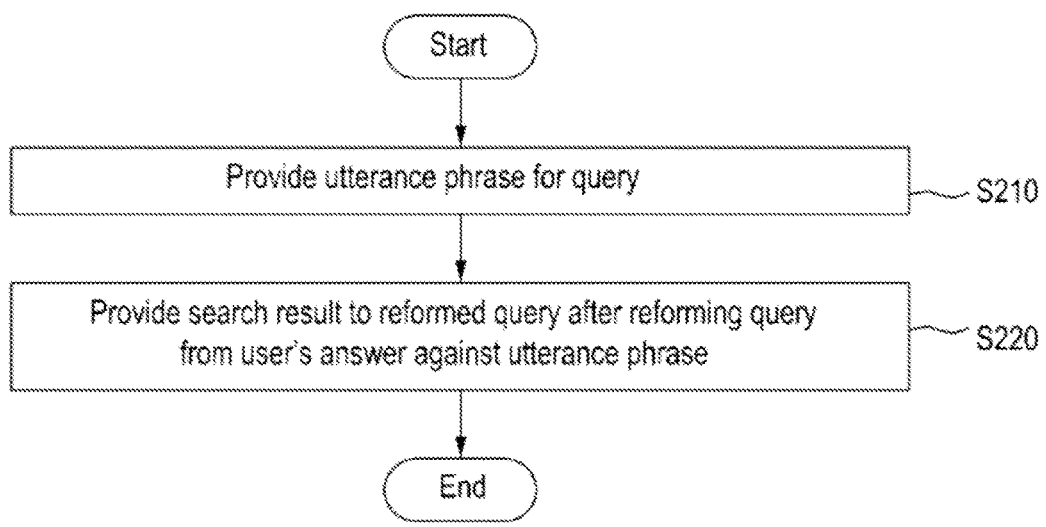
FIG. 2 is a flow chart showing a search method to offer a search result desired by a user through a conversation in accordance with an embodiment of the present invention.

FIG. 2 is a flowchart showing a search method to offer a search result desired by a user through a conversation in accordance with an embodiment of the present invention. This method can be executed through the steps in the search system, as illustrated over FIGS. 1 to 11.

In step S210, if there is an input query by a user, the search system 100 may begin a conversation with the user for correcting the query. If the query is vague or too broad in scope or category, many documents irrelevant to the user's intention for search can be inadvertently emerged. To solve such a problem, the search system 100 may offer at least an utterance phrase for a conversation with the user in order to correct and further define the query.

In this description, the term 'utterance phrase', which is prepared to clearly ask essential items necessary for revising a query, may mean inquiry for examining a search condition involved in the query from a user.

A conversation scenario with a user may be made by preliminarily defining the content and sequence of the utterance phrases respective to keywords available as queries. The following Table 1 gives exemplary conversation scenarios.

TABLE 1

| | Conversation Scenario | | |
|---|---|---|---|
| Keyword | Utterance phrase 1 | Utterance phrase 2 | ... |
| Gift | Whom do you gift? | How old is he (she)? | ... |
| Travel | Where do you travel? | What is theme for travel? | ... |
| Coordinate | What is gender? | How old? | ... |
| Hand phone | Which communication company do you find? | Which manufacturer do you find? | ... |
| Music | What kind of genre do you find? | Which musician do you prefer? | ... |
| Weather | Which country do you find? | Which area do you find? | ... |
| ... | ... | ... | ... |

The conversation scenarios are composed to determine contents of the utterance phrases, depending on a user's answer to the previous utterance phrase. For instance, if a user answers "Mother" to an inquiry that is "Whom do you gift?", the next inquiry may be proposed as "How old is your mother?" Otherwise if a user answers "Friend" to the inquiry "Whom do you gift?", the next inquiry may become "How old is your friend?" in sequence.

These keywords and conversation scenarios are just exemplarily shown, not restrictive hereto. Rather, their items can be extended as much as a search target likes.

In one embodiment, after extracting a keyword from a query, the search system 100 may offer utterance phrases according to a conversation scenario involved in the extracted keyword. During this, if multiple utterance phrases to a query input by a user are prepared, the search system 100 may offer the plurality of utterance phrases one by one in sequence, or offer all of the utterance phrases at one time.

Figure 3:
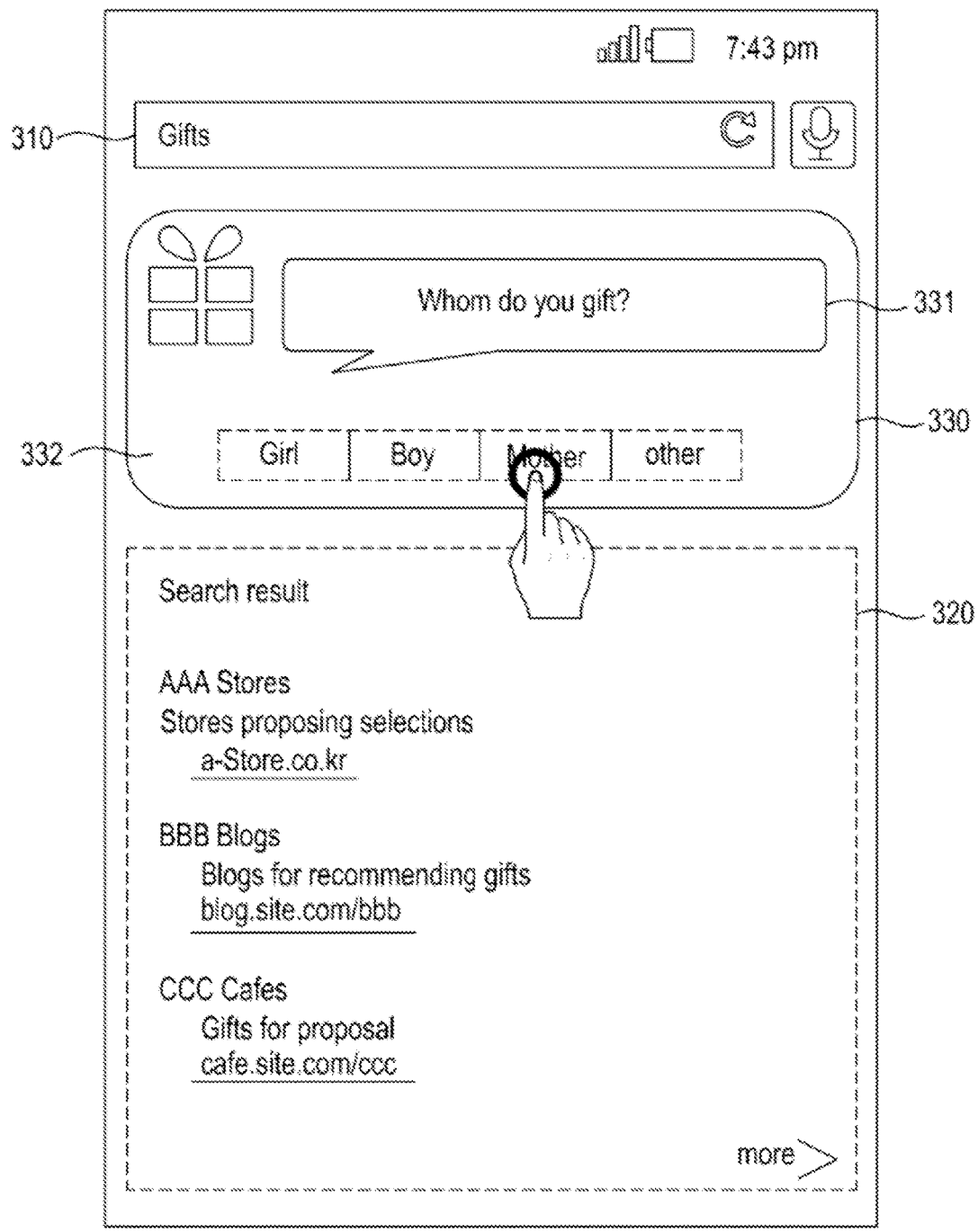
FIGS. 3 to 10 exemplarily illustrate search screens permitting a conversation between a user and a system.

Referring to FIG. 3, if a user inputs "Gifts" as a query for a search into a search window 310, the search system 100 executes a search operation with the 'Gift' as a keyword and offers a search result (hereinafter, referred to as 'first search result') 320 corresponding to the current keyword.

During this, the search system 100 may activate a conversation window 330, together with the first search result 320, for conversation with a user. The conversation window 330 may include an utterance phrase 331 for asking an item to revise a query, an index 332 for the utterance phrases 331, and others.

In the embodiment, as illustrated in FIG. 3, the search system 100 may show the index 332 together with the utterance phrase 331 at the same time while displaying the conversation window 330. As another example, the search system 100 may basically show the utterance phrase 331 in the conversation window 330 without disclosing the index 332, and thereafter show the index 332 in the conversation window 330 if there is an input of click, touch, etc. into the conversation window 330 by a user. During this, the index 332 disclosed in the conversation window 330 may be shown in various patterns, e.g. cards, characters, or lists.

Figure 4:
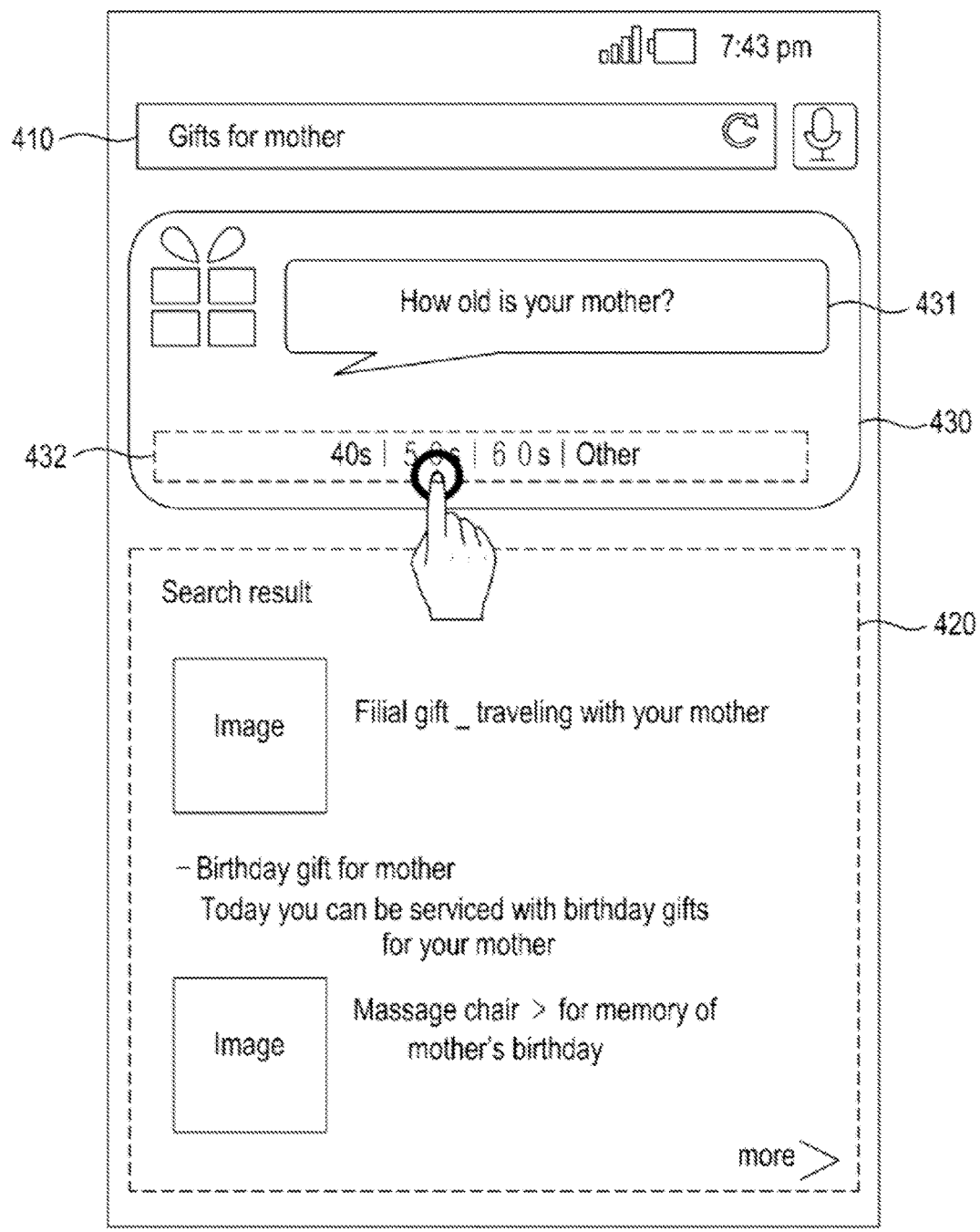
Figure 5:
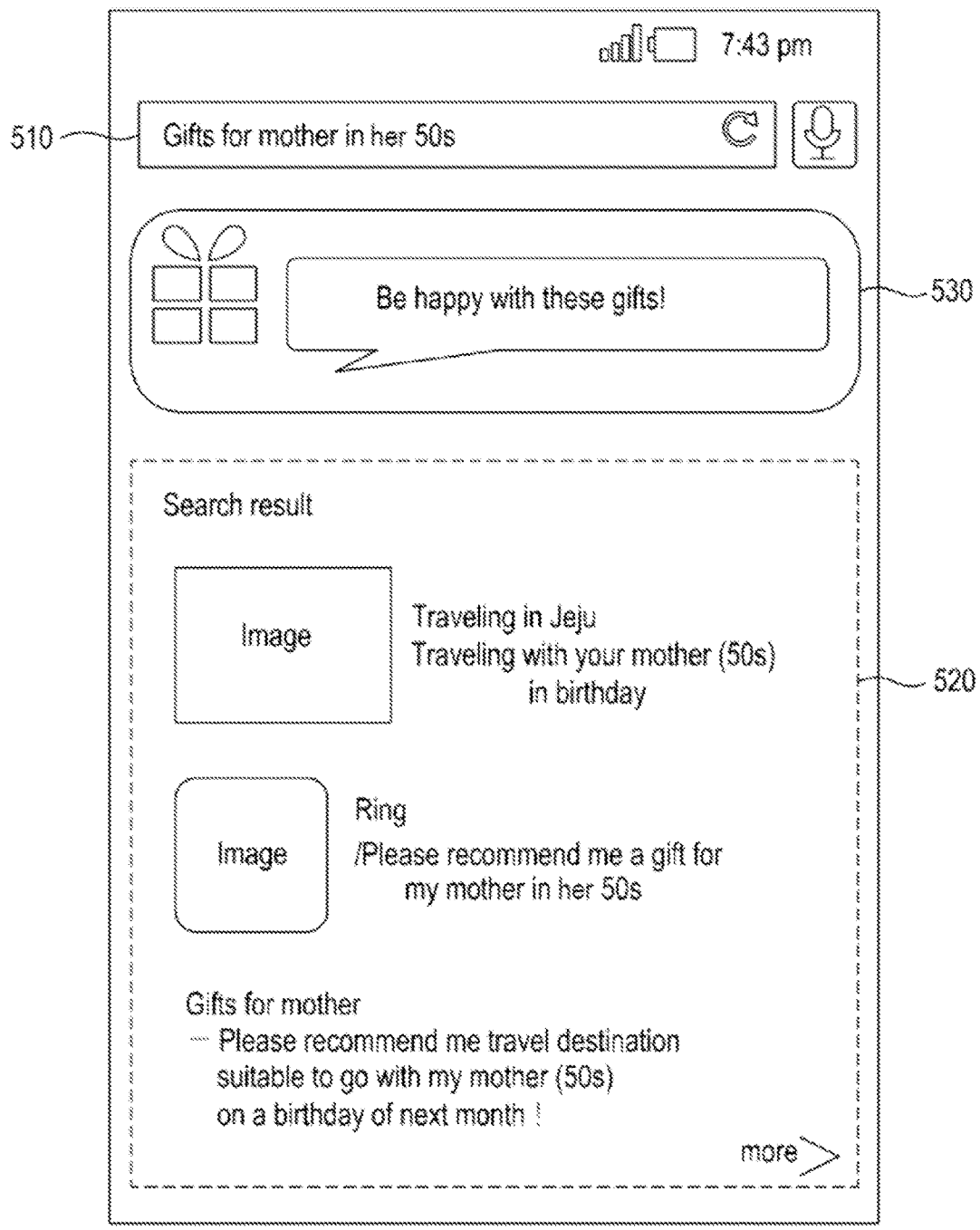

From the conversation scenario exemplarily given in Table 1, it is permissible that the utterance phrase "Whom do you gift?" can be first uttered in the conversation window 330, responding to the keyword 'Gift' included in a query. Upon this, if a user inputs his answer (e.g. "Mother"), the next inquiry may be additionally given to utter "How old is your mother?", which asks an age of a person to be gifted, in the conversation window 430 as shown in FIG. 4. After completing a user's answer input to the last one of the utterance phrases, an ending mention (e.g. "Be happy with these gifts") may be displayed in the conversation window 530 as shown in FIG. 5. Therefore, the search system 100 may conduct inquiries and answers so as to approach a search result suitable for a user's desire toward the need of "Gifts recommendation," and then obtain items for revising the query.

Additionally, at the last utterance step, the conversation window 530 may therein disclose links relevant to knowledge joint communities capable of sharing information between different users. If a user enters a relevant link, it may be permissible to open an input room for accepting characters and images therein. In the input room, there may be a basic text (e.g. "Please recommend me a gift for my mother in her 50s"), which is automatically made from the contents of the utterance phrases and the user's answers, in the form of a natural sentence.

At the index 332 or 432 displayed in the conversation window 330 or 430, answers predictable from the utterance phrases may be proposed on purpose to make a user convenient and, in addition to the proposed answers, a "direct input" function may be also provided to permit a user to directly enter his answers. With this, cases included in the index 332 or 432 may be formed of recommended answers extracted from the log data. Additionally, the index 332 or 432 may include a sentence (e.g. "Don't know") that functions to skip a current inquiry and go to the next inquiry if it is hard for a user to exactly answer to the current inquiry.

The search system 100 may provide an input window (not shown) capable of accommodating an answer if a user selects the "direct input" function. For the input window, an exclusive window may be additionally provided to accept various input modes such as text input, voice input, etc., or the search window 310 or 410 may be even used therefor while displaying a query.

Frequently, too much unnecessarily long query causes the search result to be degraded. In order to solve this problem, the search system 100 may offer an utterance phrase for guiding a query to a pithier and shorter one, clarifying the intention of the query. As an example, if a user enters a query "Travel gifts for grandfather in the 80s", the search system 100 may offer an utterance phrase (e.g. "Please try the short sentence as follows. You can find more results. Index: 'grandfather in the 80s', 'Travel gift for grandfather', etc.")

Figure 6:
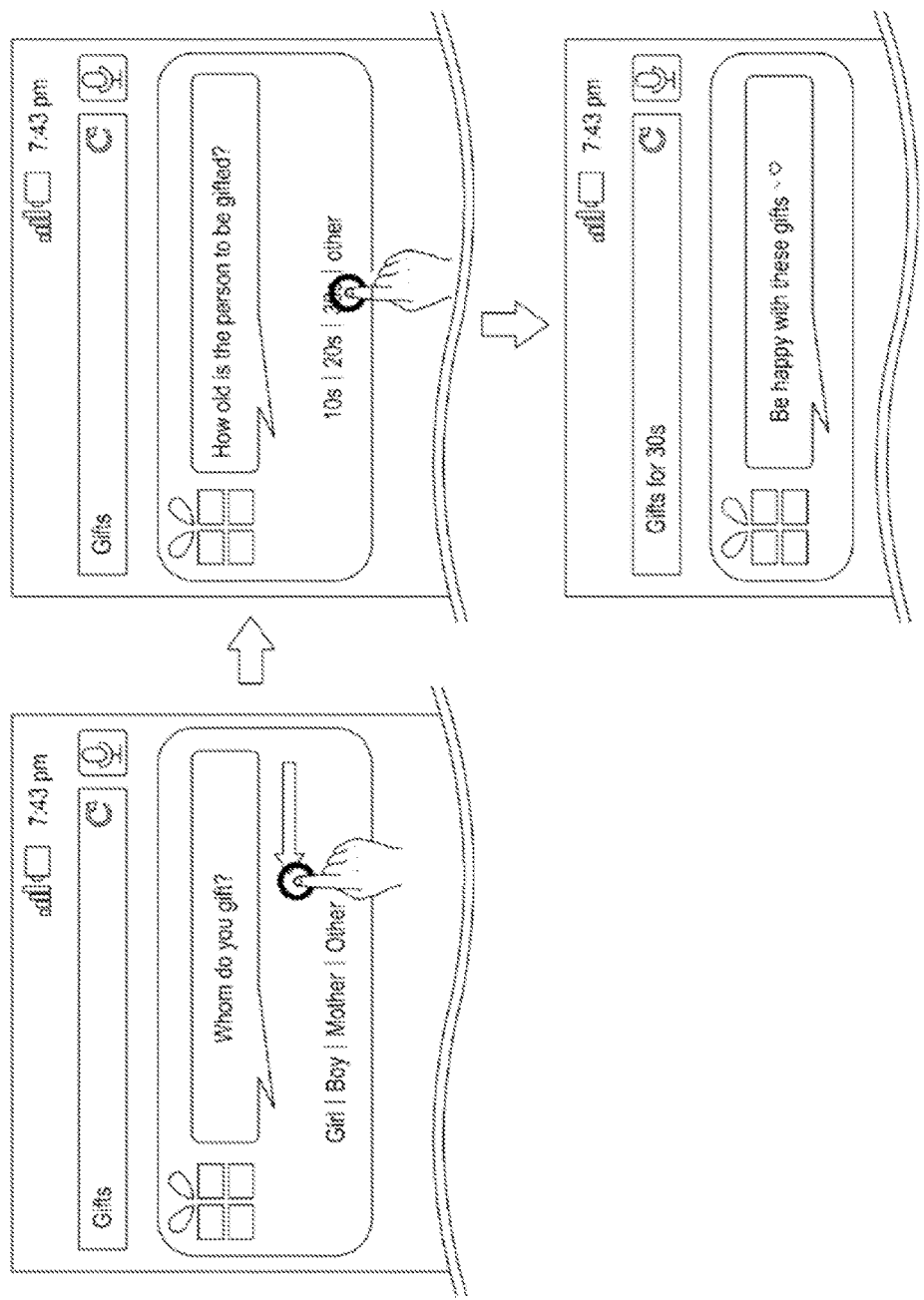

Additionally, the search system 100 may change the contents of utterance phrase, which is displayed in the conversation window, depending on a user's input responding to an inquiry of the conversation window. A user is able to confirm inquiries to his queries, or if a current inquiry of the search system 100 seems improper, skip the current inquiry and go to the next inquiry. For example, as illustrated in FIG. 6, a user is permitted to skip a current inquiry ("Whom do you gift?"), by making a gesture of shifting the conversation window from right to left, and then enter an answer to the next inquiry ("How old is the person to be gifted?). It is also allowable for a user to make a gesture of shifting the conversation window from left to right and then review the inquiry prior to the current inquiry.

Figure 7:
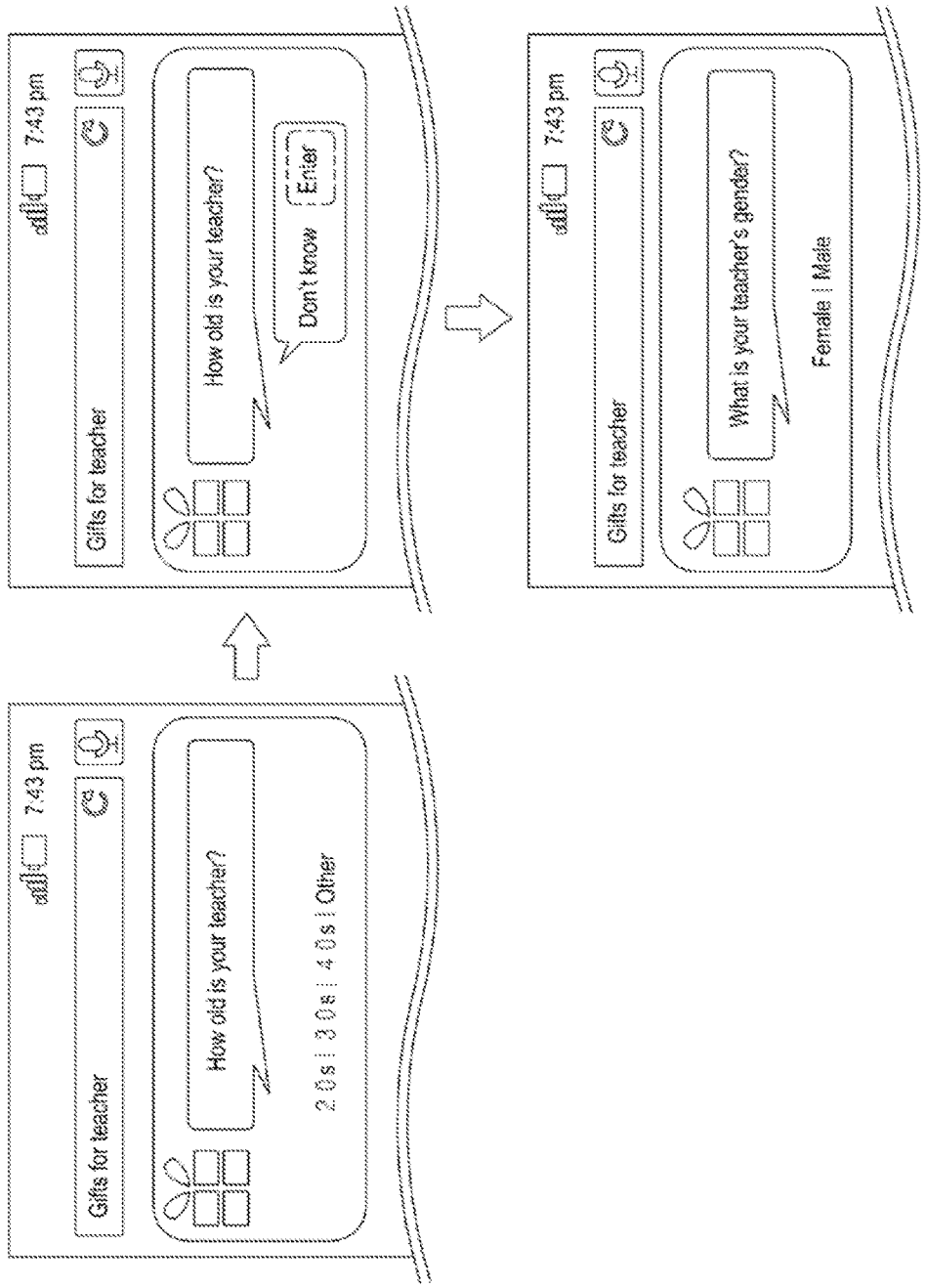

Additionally, the search system may allow a user to skip the current utterance phrase, which is displayed in the conversation window in response to the answer of the user, and switch to the next utterance phrase. A user may be permitted to input an answer, such as "Don't know", "Cannot know", "No idea", etc., to an inquiry of the search system 100 and the search system 100 may progress the subsequent utterance suitable for such an answer. For instance, as shown in FIG. 7, in the case a user enters "Don't know" through the "direct input" function after the research system 100 proposes the inquiry "How old is your teacher?" when the query is "Gifts for teacher", the search system 100 may skip its corresponding inquiry and continue to converse with the user while proposing the next inquiry "What is your teacher's gender?"

Figure 8:
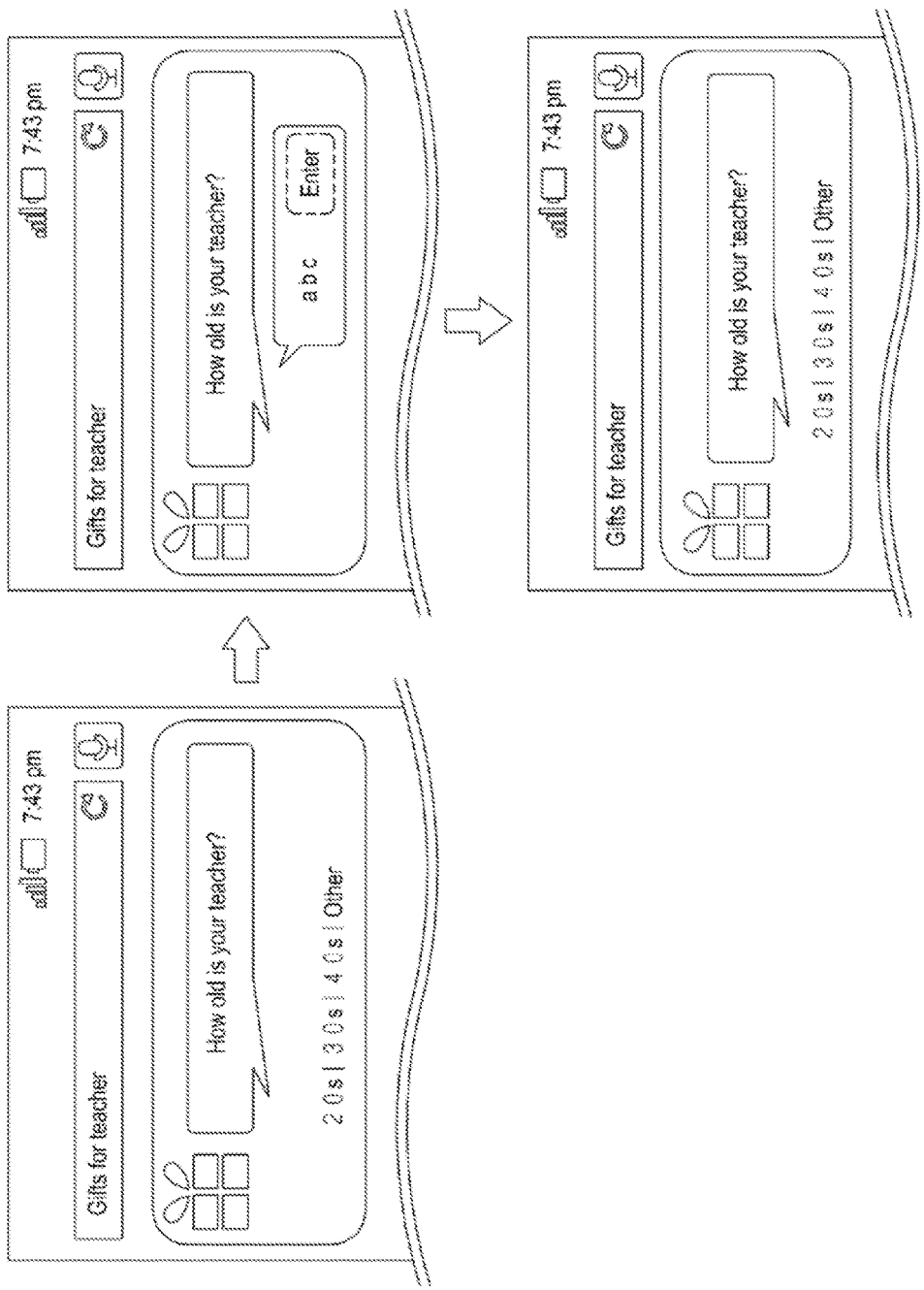

Additionally, the search system 100 may skip the current utterance phrase, which is displayed in the conversation window in accordance with connectivity between the utterance phrase and the user's answer, turn to the next utterance phrase, or propose the current utterance phrase one more time. A user may enter an answer irrelative to an inquiry of the search system 100 because of typographical errors, etc. and the search system 100 may conduct a normal conversation even to the irrelative answer to the inquiry. For example, as illustrated in FIG. 8, if an inquiry "How old is your teacher?" is proposed in response to the query "Gifts for teacher" and the user enters an answer such as "abc" that is irrelative to the inquiry, the search system 100 may display and inquire the "How old is your mother?" once more.

Accordingly, the search system 100 may derive an exact and definite query from a vague and broad query by inquiring of a user about items necessary for revising the vague and broad query by way of a conversation with the user.

Returning to FIG. 2, in step S220, after reforming a query by means of user's answers to an utterance phrase, the search system 100 may offer a search result corresponding to the reformed query (hereinafter, referred to as 'new query'). In other words, the search system may update a search result, which corresponds to a new query, from a first search result through query reformation with user's answers. During this, the search system may compose a new query by correlating user's answers with at least one of keywords included in a query.

In one embodiment, for a plurality of utterance phrases, whenever user's answers are input respectively to the plural utterance phrases, the search system 100 may every time compose a new query and offer a search result corresponding to the new query.

Exemplarily, if a user selects "Mother" at the index 332 provided by the conversation window 330 of FIG. 3, the search system 100 may reformatively generate a new query "Gifts for mother?" by combining the answer "Mother" with the query "Gifts" input into the conversation window by the user. During this, as shown in FIG. 4, when proposing utterance phrases, the search system 100 may display the new query "Gifts for mother" in the search window 410 and offer a search result 420 corresponding to the new query "Gifts for mother".

Also, if a user selects "50s" as an answer from the index 432 in response to an additional utterance phrase 431 that is proposed through the conversation window 430 of FIG. 4, the search system 100 may reform a new query "Gifts for mother in her 50s" as being revised by combining the answer "50s" with the former new query "Gifts for mother" that was reformed at the previous step. During this, as shown in FIG. 5, the research system 100 may display "Gifts for mother in her 50s" as the new query in the search window 510, when proposing the next utterance phrase, and propose a search result 520 corresponding to the "Gifts for mother in her 50s".

In another embodiment, in the case multiple utterance phrases are proposed, the search system 100 may form a new query from the user's answers to the plural utterance phrases after the user's answer to the last one of the plural utterance phrases. With this condition, the search system 100 may update a search result corresponding to the new query after the user's answer to the last utterance phrase, not updating every search result for each utterance phrase.

Additionally, in the case of plural utterance phrases, as another embodiment, the search system 100 may intermediately form new queries whenever user's answers are being input in response to at least a part of the plural utterance phrases, and offer search results corresponding to the new queries. For instance, if the utterance phrases are four in number, the search system 100 may divide the four utterance phrases into two groups by two for each and then update the search results by forming new queries to each of the two utterance phrases.

Figure 9:
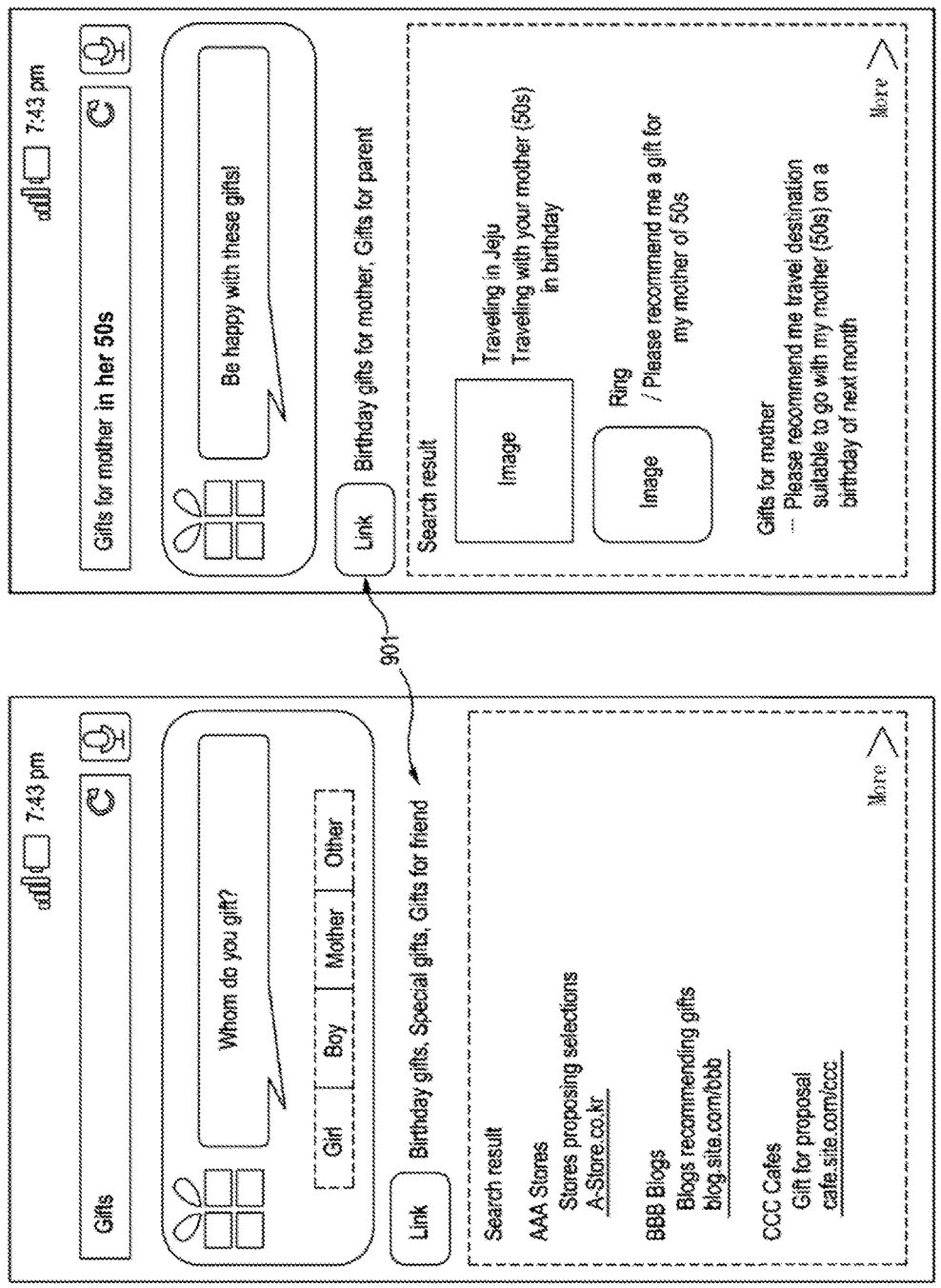

Additionally, the search system 100 may further offer a relevant keyword index corresponding to every search responding to queries and new queries. In one embodiment, as illustrated in FIG. 9, the search system 100 may recommend relevant keywords 901, e.g., "Gifts for birthday", "Special gifts", "Gifts for friend", etc., for the query "Gifts", and recommend relevant keywords 901, e.g., "Birthday gifts for mother", "Gifts for parents", etc., for a new query "Gifts for mother in her 50s".

Figure 10:
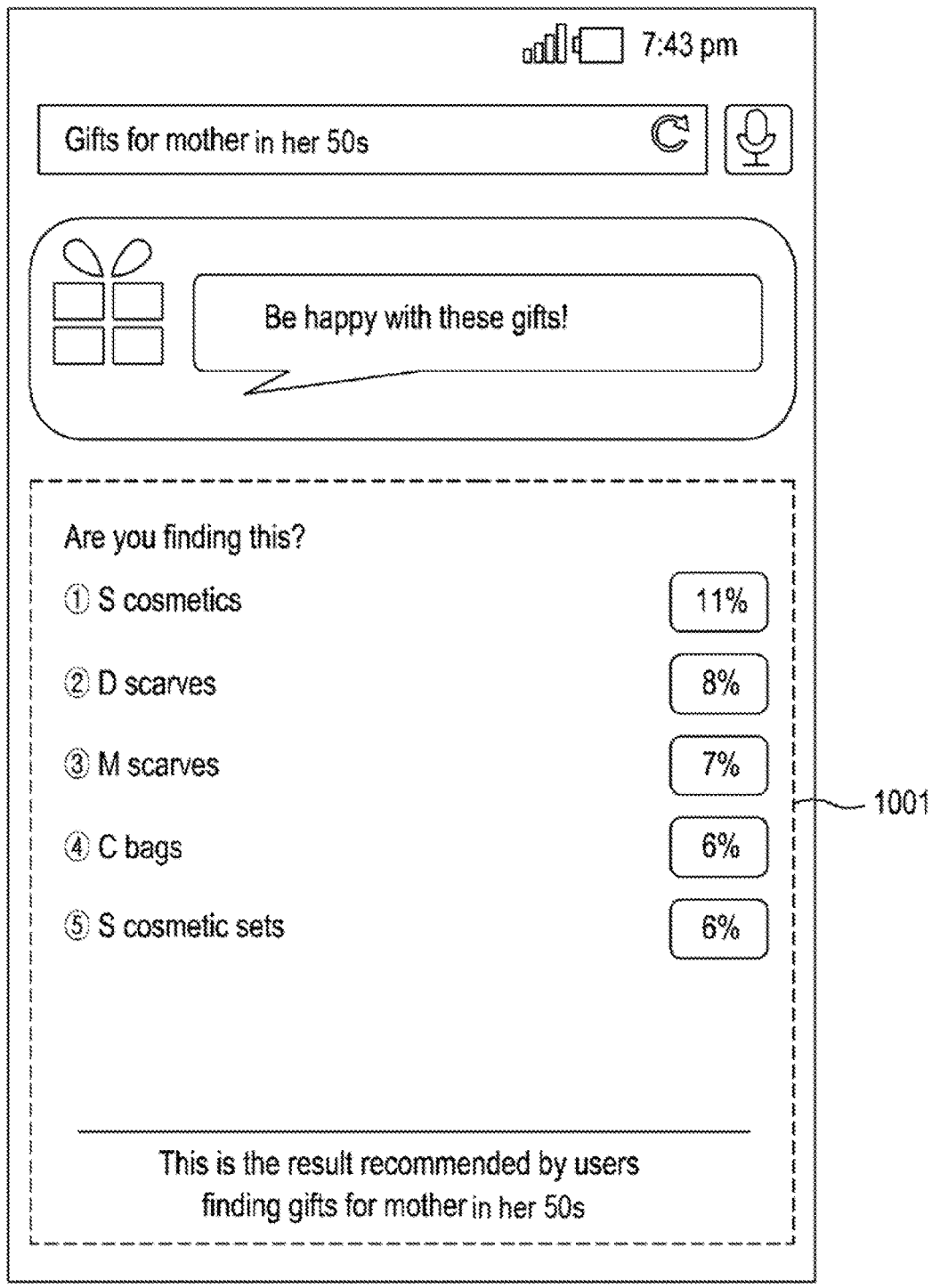

Additionally, the search system 100 may offer a search result index recommended by other users to correspondents for every search responding to queries and new queries. In one embodiment, as shown in FIG. 10, the search system 100 may offer a recommended result index 1001 including "S cosmetics", "D scarves", "M scarves", "C bags", "S cosmetic sets", etc., for a new query "Gifts for mother in her 50s".

This conversation based search method may include more abridged or additional operations on the basis of the description in conjunction with FIGS. 1 through 10. Otherwise, two or more operations may be combined, and the operations may be modified in order or position.

The methodologies according to embodiments of the present invention may be implemented in the form of program instructions prosecutable through diverse computer systems and recorded into a computer readable medium.

A program according to embodiments of the present invention may be composed in a PC based program or an application for mobile terminals. A conversation based search application according to embodiments of the present invention may be implemented in the form of independently operative program, or in-app of a specific application, being operable on the specific application.

Figure 11:
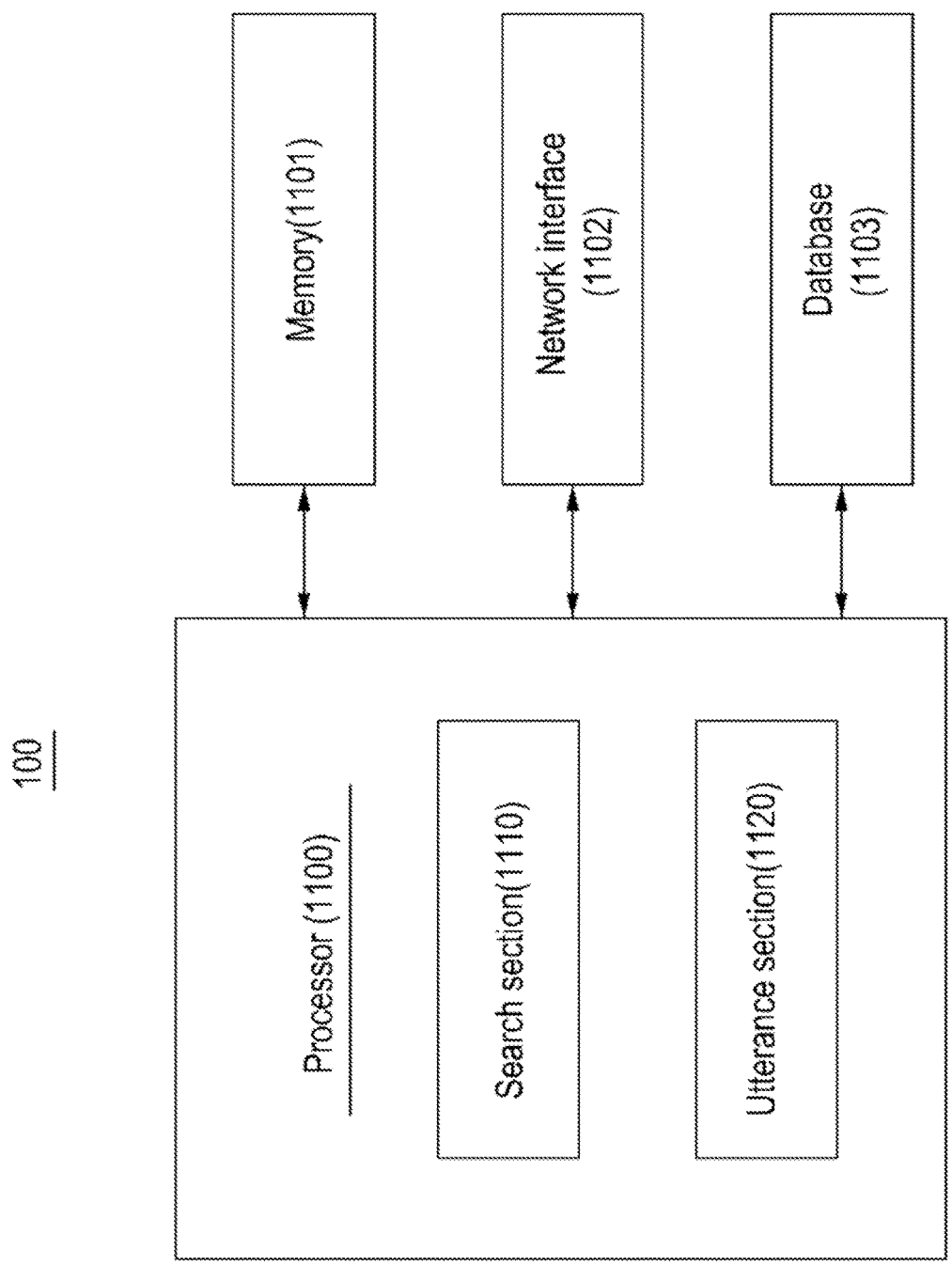
FIG. 11 is a block diagram illustrating an internal configuration of the search system offering a search result desired by a user through a conversation in accordance with an embodiment of the present invention.

FIG. 11 is a block diagram illustrating an internal configuration of the search system 100 offering a search result desired by a user through a conversation in accordance with an embodiment of the present invention. As shown in FIG. 11, the conversation based search system 100 may be configured to include a processor 1100 having a search section 1110 and an utterance section 1120, a memory 1101, a network interface 1102 and a database 1103.

The memory 1101 stores a program including instructions involved in a conversation based search service routine. The conversation based search service is capable of offering a search result most suitable for a user's intention by deriving an exact query from a user's query by way of a conversation with the user. The steps executed in the search system as described with reference to FIGS. 1 through 10 are processed by means of the program stored in the memory 1101. In one embodiment, the memory 1101 may be a hard disk, a solid state disk, an SD card, or other storage medium.

The network interface 1102 couples the conversation based search system to a network in order to complete communication with user terminals utilizing the conversation based service, and the database 1103 stores conversation scenarios including the content and sequences of utterance phrases respective to keywords corresponding to queries from users.

The processor 1100, as a device disposing of the operations in accordance with the instructions of the program stored in the memory 1101, may include a microprocessor such as a central processing unit (CPU). The internal configuration of the processor 1100 may be as follows.

The search section 1110 functions to offer a search result corresponding to a query input by a user, i.e., an initial search result. In order to offer such a search result corresponding to the user's query, the search section 1110 may target informal data such as web data, e.g., blogs, bulletin boards, etc., as well as formal data such as databases.

During this, the utterance section 1120 proposes an utterance phrase to clearly require a search condition of a user by offering a conversation function with the user for the purpose of revising the user's input query.

Additionally, when offering a search result corresponding to a query from the search section 1110, the utterance section 1120 may propose an utterance phrase relevant to the correspondent query. In one embodiment, the utterance section 1120 may extract keywords from a query and then propose an utterance phrase selected from the database 1103 in accordance with a conversation scenario relating to the keywords corresponding to the query. During this, if the multiple utterance phrases to a query input by a user are prepared, the search system 100 may propose the utterance phrases one by one in sequence through the conversation window under a predetermined order, or propose the utterance phrases at one time.

Additionally, the utterance section 1120 may switch an utterance phrase, which is displayed in the conversation window, to another in accordance with an input by a user who enters an answer while monitoring the conversation window. The user is able to confirm an inquiry of the search system to his query, or if a current inquiry of the search system seems to be inadequate, skip the current inquiry and then go to the next inquiry thereof.

Additionally, according to a user's answer input through the conversation window, the utterance section 1120 may also skip a current utterance phrase, which is displayed in the conversation window, and switch the current utterance phrase to the next one. A user is able to enter an answer such as "Don't know", "Cannot know", "No idea", etc. and the search system 100 may continue a conversation suitable for the user's answer.

Additionally, according to the connectivity between a current utterance phrase and a user's answer, the utterance phrase 1120 may skip the current utterance phrase, which is displayed in the conversation window, and switch the current utterance phrase to the next one, or re-propose the current utterance phrase. It is also possible for a user to enter an answer, due to a typographical error, irrelevant to the inquiry of the search system 100, thus the search system may arrange an appropriate conversation even for the irrelevant answer.

The search section 1110 may reform a query by means of a user's answer to an utterance phrase and then offer a new search result corresponding to the reformed new query. Therefore, the search system may update an initial search result to the new search result corresponding to the new query by way of such query reformation with the user's answer.

In one embodiment, if multiple utterance phrases are proposed, the search section 1110 may compose a new query, whenever there is an input of a user's answer to each utterance phrase, and then offer a search result corresponding to the new query.

In another embodiment, if multiple utterance phrases are proposed, the search section 1110 may form a new query at one time from all of user's answers after receiving the user's answer to the last one of the plural utterance phrases. Here, the search section 1110 updates a search result corresponding to a new query after receiving a user's answer to the last utterance phrase, not updating the search result every time for each utterance phrase.

In still another embodiment, if multiple utterance phrases are proposed, the search section 1110 may offer a search result corresponding to a new query that is intermediately formed whenever there is an input of a user's answer to at least a part of the utterance phrases.

This conversation based search system and method according to embodiments of the inventive concept may provide a search guiding service for revising a query through a conversation with a user so as to make it possible to find a document suitable for the user's intention.

Figure 12:
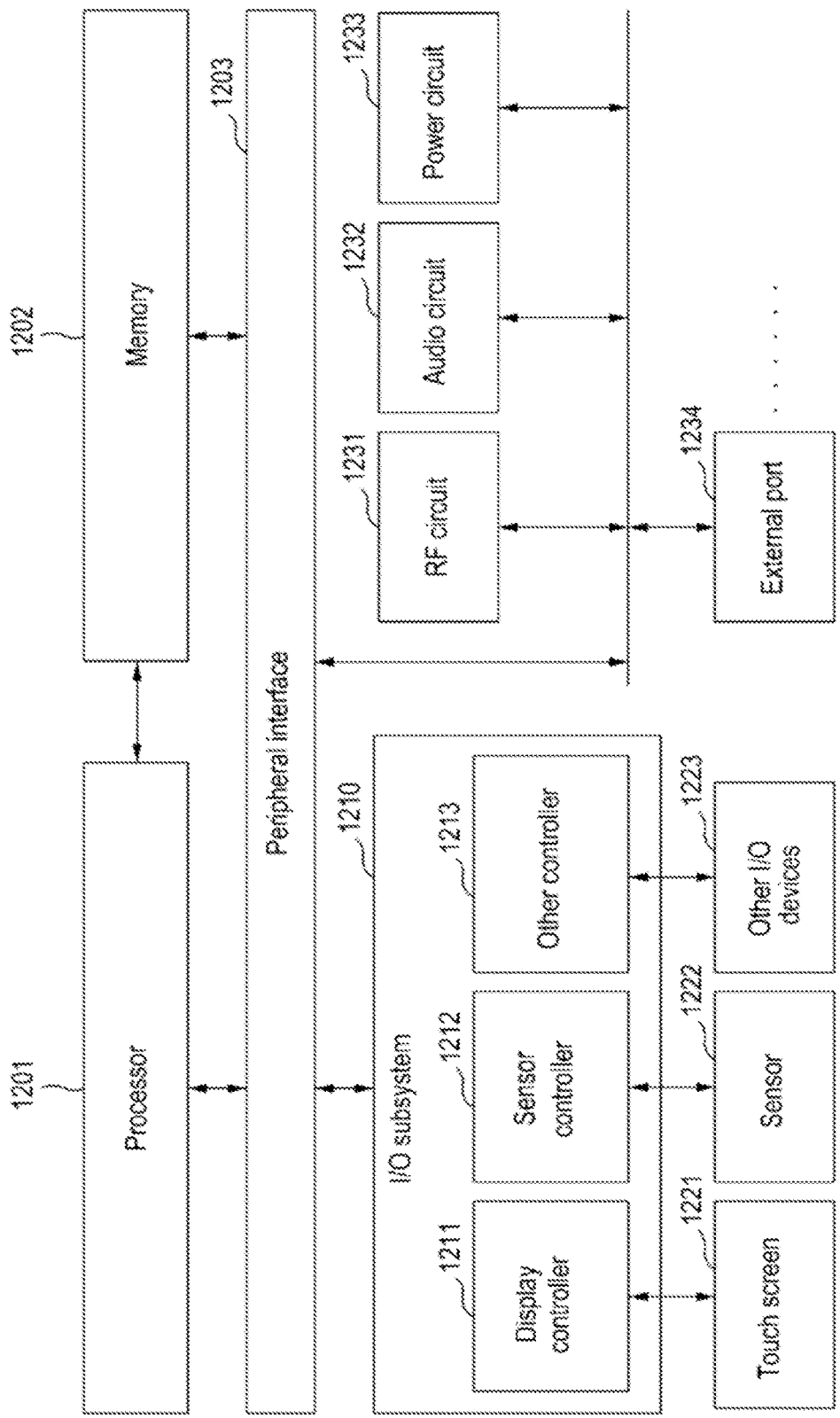
FIG. 12 is a block diagram illustrating an internal configuration of the user terminal in accordance with an embodiment of the present invention.

FIG. 12 is a block diagram illustrating an internal configuration of the user terminal 101 in accordance with an embodiment of the present invention.

The user terminal may include one or more processors 1201, a memory 1202, a peripheral interface 1203, an input/output (I/O) subsystem 1210, a touch screen 1221, a sensor 1222, other I/O devices 1223, a radio frequency (RF) circuit 1231, an audio circuit 1232, a power circuit 1233, and an external port 1234. These components may communicate each other by way of one or more buses or signal lines.

FIG. 12 exemplarily shows an example of the user terminal 101. The user terminal 101 may include more or less components than the illustrated, include two or more components coupled to each other, or have a configuration or disposition with different components. The components shown in FIG. 12 may be fabricated and arranged in hardware, software, or a combination with hardware and software, including an integrated circuit specific for one or more signal processing features or applications.

The memory 1202 may include a high-speed random access memory, a magnetic disk static random access memory, a dynamic random access memory, a read only memory, a flash memory or a nonvolatile memory. The memory 1202 may contain a software module, instructions assemblage or other data necessary for operations of the terminal. An access to the memory 1202 by means of other components such as the processor 1201 and peripheral interface 1203 may be controlled by the processor 1201.

The peripheral interface 1203 maybe coupled to an input and/or output peripheral device of the terminal to one or more processors 1201 and the memory 1202. The processor 1201 may execute a software module or instructions assemblage stored in the memory 1202, performing various functions for the terminal and processing data.

The RF circuit 1231 may transmit and receive an RF signal that is known as an electromagnetic signal. The RF circuit 1231 may convert an electric signal into an electromagnetic signal, convert an electromagnetic signal into an electric signal, or communicate with a communication network and other communication devices via an electromagnetic signal. The RF circuit 1231 may include a well-known circuit for executing these functions. This circuit may include an antenna system, an RF transceiver, one or more amplifiers, a tuner, one or more oscillators, a digital signal processor, a CODEC chipset, a Subscriber Identification Module (SIM) card, a memory, etc., but is not restrictive hereto. The RF circuit 1231 may be operable in communication with a wireless network such as cellular telephone network, wireless Local Area Network (LAN) and/or Metropolitan Area Network (MAN), a network like the internet that is called 'World Wide Web (WWW)', and/or other devices by way of wireless communication. This wireless communication may include Global System for Mobile Communication (GSM), Enhanced Data GSM Environment (EDGE), Wideband Code Division Multiple Access (WCDMA), Code Division Multiple Access (CDMA), Time Division Multiple Access (TDMA), Bluetooth, Wireless Fidelity (Wi-Fi) (of IEEE 801 11a, IEEE 801 11b, IEEE 801 11g and/or IEEE 801 11n, etc.), Voice over Internet Protocol (VoIP), Worldwide interoperability for Microwave Access (WiMAX), Long Term Evolution (LTE), e-mail protocol such as Internet Message Access Protocol (IMAP) and/or Post Office Protocol (POP), instant messaging such as eXensible Messaging and Presence Protocol (XMIPP), Session Initiation Protocol for Instant Messaging and Presence Leveraging Extensions (SIMPLE), Instant Messaging and Presence Service (IMPS) or Short Message Service (SMS), a communication protocol that has not been yet developed until the filing data of the present application. Further, the wireless communication may operable with a plurality of communication protocols and technologies, not restrictive to the aforementioned types.

The audio circuit 1232 may utilize a speaker and/or a microphone to provide an audio interface between a user and the terminal. The audio circuit 1232 may receive audio data from the peripheral interface 1203, convert the audio data into an electric signal, and then transfer the electric signal to the speaker. The speaker may convert the electric signal into a human-audible sound wave. The audio circuit 1232 may receive an electric signal that is converted from a sound wave by a microphone. The audio circuit 1232 may convert an electric signal into audio data and transfer the audio data to the peripheral interface 1203 for processing the audio data. This audio data may be found from or transferred to the memory 1202 or the RF circuit 1231 by means of the peripheral interface 1203. According to an aspect of the embodiments, the audio circuit 1232 may further include a headset jack. The headset jack may provide an interface between the audio circuit 1232 and a portable audio input/output peripheral device such as a headset equipped with input and output terminals or an output-only headphone.

The power circuit 1233 may supply power to all or a part of the components of the user terminal 101. In one embodiment, the power circuit 1233 may include a power management system, one or more power sources such as battery or Alternating Current (AC), a charging system, a power failure detection circuit, a power converter or an inverter, a power state indicator, and other components for generating, managing and distributing power of the user terminal.

The I/O subsystem 1210 may be coupled to an input/output peripheral device, such as the touch screen 1221, the sensor 1222 or the other I/O devices 1223, to the peripheral interface 1203. The I/O subsystem 1210 may include a display controller 1211, a sensor controller 1212, or one or more I/O controller 1213. According to another aspect of the embodiments, the touch screen 1221, the other I/O devices 1223 may be coupled to the peripheral interface 1203 without the I/O subsystem 1210.

An aspect of the embodiments, at least one of the processor 1201, the peripheral interface 1203 and the I/O subsystem 1210 may be integrated on a single chip. Otherwise, at least one of the processor 1201, the peripheral interface 1203 and the I/O subsystem 1210 may be partly integrated on a single chip.

The display controller 1211 may receive an electric signal from, transfer an electric signal to, or receive/transfer an electric signal from/to the touch screen 1221 including a touch-detection area. Upon operation of the display controller 1211, the touch screen 1221 may display a visible output for a user. This visible output may include a graphic pattern, a text, an icon, a video and a combination with them (hereinafter, referred to as 'graphic pattern'). In an aspect of the embodiments, a part or all of the visible output may correspond to the user interface described hereinbelow.

The touch screen 1221 may be used with the technology of Liquid Crystal Display (LCD), Light emitting Polymer Display (LPD) or Active-Matrix Organic Light Emitting Diode (AMOLED), but is available with other display technology. Additionally, the touch screen 1221 and the display controller 1211 are operable in capacitive, resistive, infrared or surface acoustic wave technology, but are available with a known or coming touch detection technology, not restrictive hereto. Additionally, the touch screen 12 and the display controller 1211 may detect a contact, a motion or release of the contact by means of a proximity sensor array or other components for determining one or more contact points with the touch screen 1221.

The display controller 1211 may be coupled to a screen not including a touch-detection area. The screen without touch-detection area may receive an electrical signal from the display controller 1211 and display a visible output for a user. The screen without touch-detection area may used with the technology of Plasma Display Panel (PDP), Electronic Paper Display (EPD), LCD, LPD, OLED or AMOLED, but are available with other display technologies. A user terminal utilizing a screen without touch-detection area may provide input/output devices such as a physical keyboard, mouse, button, etc. as a user interface for operation.

One or more of the other I/O controllers 1213 may receive an electric signal from the other I/O devices 1223 or transfer an electric signal to the other I/O devices 1223. The other I/O devices 1223 may for example include a button, a touchpad, a dial, a slider switch, a joystick, etc. Additionally, the other I/O controller 1213 may be coupled up to anyone of an infrared port, an USB port and a pointer device such as mouse.

According to an aspect of the embodiments, the other I/O devices 1223 may include one or more physical or virtual buttons. For virtual buttons, the buttons and button controller may be parts of the touch screen 1221 and the display controller 1211 respectively. In an aspect of the embodiments, the button may include an up/down button, a locker button or a push button for controlling volume of the speaker or microphone. In an embodiment, if a user shortly presses the push button, the touch screen 1221 is released from its lockup state. Then, gesturing on the touch screen may permit the terminal to begin its process of releasing its lockout state. If a user lengthily presses the push button, the terminal may be powered on or off.

According to another aspect of the embodiments, the other I/O devices 1223 may include one or more physical keyboards or virtual soft keyboards. The keyboard may be used with a QWERTY symbol and/or a non-QWERTY symbol. In the virtual soft keyboard, the soft keyboard and soft keyboard controller may be parts of the touch screen 1221 and the display controller 1211 respectively. In an embodiment, the soft keyboard may include graphic patterns (or soft keys) less than keys of the physical keyboard in number. With this, a user is able to select one or more graphic patterns in the soft keyboard, and thereby display one or more correspondent symbols on the touch screen 1221.

According to still another aspect of the embodiments, the other I/O devices 1223 may include a touchpad for activating or inactivating a specific function. In an embodiment, different from the touch screen 1221, the touchpad may include a touch-detection area not displaying a visible output. Additionally, the touchpad may be a touch-detection surface separated from the touch screen 1221, or a part of a touch-detection surface formed and extended by the touch screen 1221.

As such, according to the embodiments of the present invention, it is capable of effectively revising an incomplete query by guiding the incomplete query that is inferior or vague, which is caused by its long sentence, to a clear query by way of a conversation with a user. Moreover, according to the embodiments of the inventive concept, it is also capable of offering a search result most adequate to a user's intention through a direct and definite inquiry by clearly asking the user items necessary for revising a query.

The devices described above may be implemented with hardware components, software components, and/or combinations of hardware and software components. For instance, the devices and components described in the embodiments may be implemented using one or more general computers or specialized computers, as like a processor, a controller, an Arithmetic Logic Unit (ALU), a Digital Signal Processor (DSP), a microcomputer, a Field Programmable Gate Array (FPGA), a Programmable Logic Unit (PLU), a microprocessor, or any other device capable of executing and responding instructions. A processing unit may conduct an Operating System (OS) and one or more software applications executed on the OS. Additionally, a processing unit may access, store, operate, process and generate data in response to execution of software. For convenience of understanding, while there is a case that a processing unit is used in singularity, it can be seen by those skilled in the art that the processing unit may include a plurality of processing elements and/or plural types of processing elements. In an embodiment, a processing unit may include a plurality of processors, or one processor and one controller. Otherwise, a processing unit may be featured in another processing configuration such as parallel processor.

The software may include computer programs, codes, instructions, or one or more combinations of them, and compose a processing unit to make a desired operation, or independently or collectively command a processing unit to operate. The software and/or data, for the purpose of being analyzed or providing instructions or data, may be permanently or temporarily embodied in a material machine, a component, a physical device, virtual equipment, a computer storage medium or unit, or a signal wave being transferred. The software may be distributed over a computer system coupled to a network, and stored or executed in the manner of distribution. The software and data may be stored in one or more computer readable recording media.

This method according to the embodiments of the present invention may be implemented in the form of program instructions executable through various computing tools and recorded in a computer readable medium. The computer readable medium may include program instructions, data files, data structures, etc. individually or associatively. The program instructions recorded in the medium may be specifically designed and formed for the embodiments, but may be known and practicable by those skilled in the art. The computer readable medium may be exemplified to include a hardware device especially formed to store and execute program instructions, e.g. a magnetic medium such as hard disk, floppy disk or magnetic tape, an optical recording medium such as CD-ROM or DVD, a magneto-optical medium such as floptical disk, or a memory such as ROM, RAM or flash memory. The program instructions may exemplarily include high class language codes executable in a computer by means of an interpreter, as well as machine language codes as made by a compiler. The aforementioned hardware unit may be formed to be operable as one or more software modules in order to perform the operations according to the embodiments of the inventive concept, and as are the reverse.

As described above, it is possible to effectively revise an incomplete query by guiding a long, inferior or vague query into a correct query through a conversation with a user.

Moreover, expressly asking a user an item necessary for adjusting a query is helpful to offering a search result most suitable for a user's intention, by way of direct and clear questioning and answering process.

While the present invention has been described with reference to exemplary embodiments, it will be apparent to those skilled in the art that various changes and modifications may be made without departing from the spirit and scope of the present invention. For instance, even though the technical manners aforementioned are performed in different orders, and/or the components, such as systems, structures, devices, units, circuits, etc., are combined or cooperated in different ways or replaced with different components or equivalents, the present invention will be desirably achieved without insufficiency.

Therefore, other implementations, embodiments and equivalents to the claims may be wholly included in the claims set forth hereinafter.

What is claimed is:

1. A method for searching the internet from a user terminal through a search system functioning as a search engine, wherein the search system is in communication with the internet, comprising:
   extracting a keyword from an initial query input into a search window by a user through the user terminal, wherein the search system is configured to search the internet for documents, wherein the documents are comprised of websites, web data, and databases;
   proposing, by the search system, at least one predetermined utterance phrase corresponding to the initial query, based on the extracted keyword, wherein the predetermined utterance phrase has been selected from a database that includes a plurality of keywords stored therein, with each of said stored keywords being associated, in the database, with at least one utterance phrase;
   presenting the utterance phrase associated with the extracted keyword to the user via the user terminal into the search window;
   receiving an answer to the presented utterance phrase from the user by a touch on a touch-detection surface separated from the search window;
   reforming, by the search system, the initial query based on the answer from the user to the utterance phrase that was proposed to the user by the search system and providing the reformed query to the search window;
   conducting a search of the internet based on the reformed query, said step of conducting a search of the internet is only performed after receiving the user's answer to a final utterance phrase presented to the user, without conducting a search of the internet based on the initial query; and
   offering, by the search system, a search result to the user via the user terminal, where the offered search result corresponds to the search based on the reformed query, wherein the search result includes a listing of a plurality of websites,
   wherein the reformed query is always made from the answer from the user to the utterance phrase in combination with at least one of the keywords contained in the initial query.

2. The method according to claim 1, wherein when a plurality of the utterance phrases corresponding to the query are proposed, the plurality of the utterance phrases are offered to the user terminal one by one in sequence.

3. The method according to claim 2, wherein proposing the utterance phrases comprises:
   displaying a conversation window containing at least one of the utterance phrases; and
   switching the utterance phrase, which is displayed in the conversation window, according to user's input to the conversation window.

4. The method according to claim 2, wherein proposing the utterance phrase comprises:
   displaying a conversation window containing the utterance phrase; and
   skipping a current utterance phrase, which is displayed in the conversation window, according to an answer input through the conversation window and switching the current utterance phrase to a next utterance phrase.

5. The method according to claim 2, wherein proposing the utterance phrase comprises:
   displaying a conversation window containing the utterance phrase; and
   according to an answer input through the conversation window and connectivity of the utterance phrase, skipping a current utterance phrase, which is displayed in the conversation window, and switching the current utterance phrase to a next utterance phrase or re-displaying the current utterance phrase.

6. The method according to claim 1, wherein the utterance phrase is an inquiry asking a condition corresponding to the initial query.

7. The method according to claim 1, wherein when a plurality of the utterance phrases corresponding to the query are proposed, the plurality of the utterance phrases are offered to the user terminal at one time.

8. A conversation based search system, functioning as a search engine, for searching the internet from a user terminal, comprising:
   an utterance section configured to extract a keyword from an initial query input into a search window by a user through the user terminal, wherein the search system is configured to search the internet for documents, wherein the documents are comprised of websites, web data and databases, and to propose at least one predetermined utterance phrase corresponding to the initial query, based on the extracted keyword, wherein the predetermined utterance phrase has been selected from a database that includes a plurality of keywords stored therein, with each of said keywords being associated, in the database, with at least one utterance phrase; and
   wherein the utterance section is configured to present the utterance phrase associated with the extracted keyword to the user via the user terminal into the search window, and further wherein the utterance section is also configured to receive an answer to the presented utterance phrase from the user by a touch on a touch-detection surface separated from the search window;
   a search section configured to reform the initial query based on the answer of the user to the utterance phrase that was proposed to the user by the search system, provide the reformed query to the search window, search the internet based on the reformed query, and offer a search result to the user via the user terminal, where the search result corresponds to the search based on the reformed query, wherein the search result includes a listing of a plurality of websites,
   wherein searching the internet based on the reformed query is performed after receiving the user's answer to a final utterance phrase presented to the user, without conducting a search of the internet based on the initial query, and
   wherein the reformed query is always made from the answer from the user to the utterance phrase in combination with at least one of the keywords contained in the initial query.

9. The system according to claim 8, wherein, when a plurality of the utterance phrases are proposed, the utterance section proposes the utterance phrases one by one in sequence.

10. The system according to claim 9, wherein the utterance section is configured to:
    display a conversation window including at least one of the utterance phrases; and
    switch the utterance phrase displayed in the conversation window in accordance with user's input to the conversation window.

11. The system according to claim 9, wherein the utterance section is configured to:
    display a conversation window including the utterance phrase; and
    skip a current utterance phrase displayed in the conversation window in accordance with contents of an answer input through the conversation window and switch the current utterance phrase to a next utterance phrase.

12. The system according to claim 9, wherein the utterance section is configured to:
    display a conversation window including the utterance phrase; and
    according to an answer input through the conversation window and connectivity of the utterance phrase, skip a current utterance phrase displayed in the conversation window and switch the current utterance phrase to the next utterance phrase, or re-display the current utterance phrase.

13. The system according to claim 8, wherein the utterance phrase is an inquiry for requiring a search condition corresponding to the initial query.

14. A non-transitory computer readable medium storing instructions to control a computer system in communication with the internet for a document search of the internet, the instructions controlling the computer system to execute the functions of a search engine, comprising:
    extracting a keyword from an initial query input into a search window by a user through a user terminal, wherein the search engine in configured to search the internet for documents, wherein the documents are comprised of websites, web data, and databases;
    proposing an utterance phrase corresponding to the initial query based on the extracted keyword, wherein the utterance phrase has been selected from a database that includes a plurality of keywords stored therein, with each of said stored keywords being associated, in the database, with at least one utterance phrase;
    presenting the utterance phrase associated with the extracted keyword to the user via the user terminal into the search window;
    receiving an answer to the presented utterance phrase from the user by a touch on a touch-detection surface separated from the search window;
    reforming the initial query based on the answer from the user to the utterance phrase that was proposed to the user and providing the reformed query to the search window;
    conducting a search of the internet based on the reformed query, said step of conducting a search of the internet is only performed after receiving the user's answer to a final utterance phrase presented to the user, without conducting a search of the internet based on the initial query; and
    offering a search result to the user via the user terminal, wherein the offered search result corresponds to the search based on the reformed query, wherein the search result includes a listing of a plurality of websites, and wherein the reformed query is always made from the answer from the user to the utterance phrase in combination with at least one of the keywords contained in the initial query.

\* \* \* \* \*